Nov. 27, 1928.

S. P. SHELL

MOISTURE PRESERVER

Filed May 9, 1927

1,693,318

Inventor

S. P. Shell.

By Lacey & Lacey, Attorneys

Patented Nov. 27, 1928.

1,693,318

UNITED STATES PATENT OFFICE.

SANDERS P. SHELL, OF ANNA, TEXAS.

MOISTURE PRESERVER.

Application filed May 9, 1927. Serial No. 190,068.

This invention relates to means for planting seed in a furrow and provides an attachment adapted for use in connection with a planter or other implement having a seed distributing mechanism.

The invention supplies a device, including a few number of parts, which in operation plants the seeds in a manner to preserve the moisture which is vital to germination in arid sections and during a drought.

While the drawings illustrate a preferred embodiment of the invention, it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which, Figure 1 is a side view of a planter attachment embodying the invention, parts of the standard and seed tube being broken away.

Corresponding and like parts are referred to in the following description and designated in the several views of the drawings by like reference characters.

The numeral 1 designates a standard which is adapted to form connecting means between the device and a planter or other device to which the attachment is connected. The numeral 2 designates the usual tube or spout for conveying the seed from the distributing mechanism into the furrow. These parts 1 and 2 may be of any usual or well known construction and are illustrated to demonstrate more fully the application of the invention.

Figure 1:
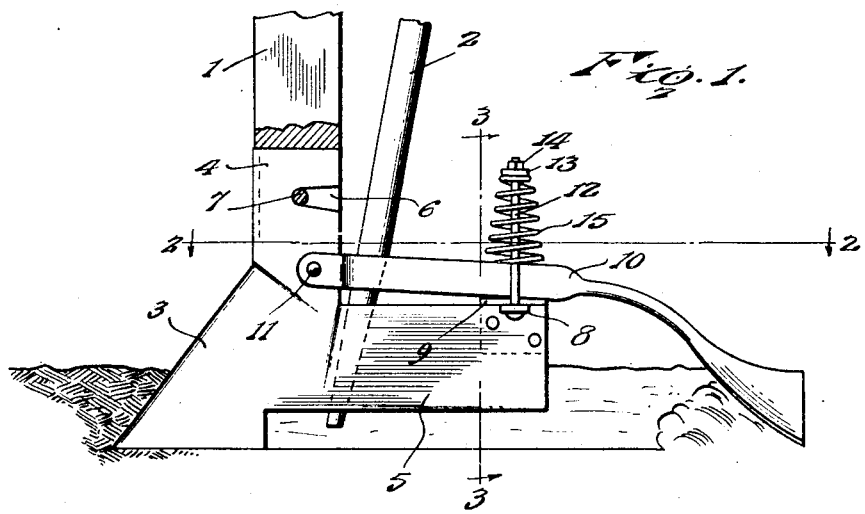
Figure 2:
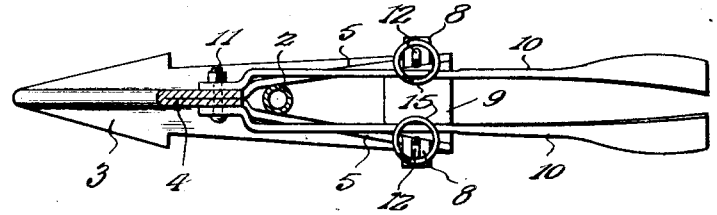
Figure 2 is a horizontal sectional view on the line 2—2 of Figure 1.
Figure 3:
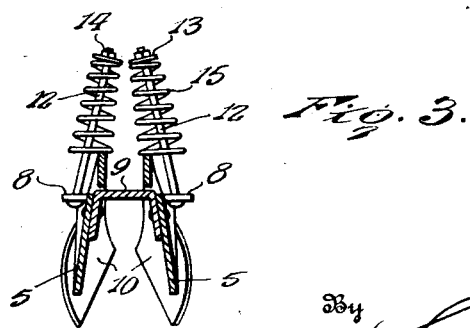
Figure 3 is a vertical transverse sectional view on the line 3—3 of Figure 1, looking to the rear as indicated by the arrows.

The device comprises an opener 3, from which a shank 4 projects vertically and spaced wings 5 which project rearwardly along divergent lines to prevent the earth from falling into the furrow formed by the opener 3. The several parts may be of any preferred construction and are usually formed of a blank of sheet metal of suitable gage, folded upon itself substantially as indicated in Figure 2. The opener 3 inclines upwardly and rearwardly from its point and the sides thereof flare symmetrically, in substantially the same manner as a cultivator shovel. The opener projects some distance below the lower edges of the wings 5, as indicated most clearly in Figure 1, the purpose being to compress the bottom of the furrow to form a bed upon which the seeds are deposited, thereby preserving the moisture and preventing rapid dissipation thereof. The shank 4 is formed with a rearwardly extending open slot 6 which receives the transverse bolt 7 by means of which the device is made fast to the lower end of the standard 1. Apertured ears 8 project outwardly from the rear ends of the wings 5. A yoke 9 connects the rear ends of the wings 5, as indicated most clearly in Figure 3. Coverers 10 are pivoted at their forward ends to the opener, as indicated at 11, and extend rearwardly over the wings 5 and curve downwardly and are so shaped and arranged as to move the earth at the sides of the furrow to cause it to fill the same, thereby covering the seeds, said earth being slightly compressed in a manner well understood. The coverers 10 consist of narrow strips of metal, the rear portions of which are curved downwardly and rearwardly and given a slight twist, whereby to engage the earth at the sides of the furrow and move the same inwardly and compress the earth after it has filled the furrow and covered the seeds. The forward portion of the coverers extends over the wings 5 and rests upon the yoke 9. Rods 12 pass through the apertures of the ears 8 and extend upwardly and pass through openings formed in plates 13 and receive nuts 14. The upper end portion of the rods 12 is threaded and by adjusting the nuts 14 the plates 13 may be adjusted vertically, whereby to regulate the tension of open conical springs 15, which are interposed between the plates 13 and the coverers 10. The springs 15 engage and rest upon the upper edges of the coverers 10 and admit of the coverers having an independent movement. The springs 15 yieldably hold the coverers 10 upon the ground and by adjusting the plates 13 vertically the tension of the springs 15 may be regulated to vary their pressure upon the coverers.

Having thus described the invention, I claim:

1. A planter attachment comprising an opener, spaced wings extending rearwardly from the opener, a yoke connecting the rear ends of the wings, coverers extending over and limited in their downward movement by the wings and pivoted at their forward ends to the opener and having their rear ends curved rearwardly and downwardly, rods extended upwardly from the rear ends of said wings, plates adjustable upon the upper ends of the rods, and springs seated upon the coverers and retained in place by the plates applied to the upper ends of the said rods.

2. A planter attachment comprising an opener, spaced wings extending rearwardly from the opener, and having outwardly disposed apertured ears at their rear ends, a yoke connecting the rear ends of the wings, coverers extending over and limited in their downward movement by the wings and pivoted at their forward ends to the opener and having their rear ends curving downwardly and shaped to move the earth inwardly and compress the same, rods passing through the said apertured ears, plates adjustable on the upper ends of the rods, and springs seated upon the coverers and held in place by the said plates on the upper ends of said rods.

3. A planter attachment comprising an opener, spaced wings projected rearwardly from the opener and having outwardly disposed apertured ears at their rear ends, a yoke connecting the rear ends of said wings, coverers extending over and limited in their downward movement by the wings and pivoted at their forward ends to the opener, rods passing through the said apertured ears, plates on the upper ends of the rods, means for adjusting said plates vertically and a spring seated upon each of the coverers and surrounding each of the rods and confined between the plates at the upper ends of the said rods and the said coverers.

In testimony whereof I affix my signature.

SANDERS P. SHELL [L. S.]